United States Patent
Jang et al.

(10) Patent No.: US 6,301,128 B1
(45) Date of Patent: Oct. 9, 2001

(54) CONTACTLESS ELECTRICAL ENERGY TRANSMISSION SYSTEM

(75) Inventors: Yungtaek Jang, Apex; Milan M. Jovanović, Cary, both of NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/500,454

(22) Filed: Feb. 9, 2000

(51) Int. Cl.$^7$ ................................................ H02M 3/335
(52) U.S. Cl. ............................... 363/17; 363/89; 363/98; 363/127; 363/132
(58) Field of Search ........................... 363/15–17, 24–26, 363/89, 98, 127, 132; 307/104; 320/108

(56) References Cited

U.S. PATENT DOCUMENTS

| | | |
|---|---|---|
| 3,938,018 | 2/1976 | Dahl . |
| 4,800,328 | 1/1989 | Bolger et al. . |
| 5,070,293 | 12/1991 | Ishii et al. . |
| 5,216,402 | 6/1993 | Carosa . |
| 5,341,083 | * 8/1994 | Klonz et al. ............... 320/2 |
| 5,550,452 | 8/1996 | Shirai et al. . |
| 5,570,276 | * 10/1996 | Cuk et al. ............... 363/16 |
| 5,608,771 | * 3/1997 | Steigerwald et al. ........... 378/15 |
| 5,638,260 | * 6/1997 | Bees ........................ 363/17 |
| 5,777,866 | * 7/1998 | Jacobs et al. ............. 363/126 |
| 6,055,170 | * 4/2000 | Yee ......................... 363/89 |
| 6,069,802 | * 5/2000 | Priegnitz ................... 363/21 |

OTHER PUBLICATIONS

Don A. Pedder, "A Contactlesss Electrical Energy Transmission System," IEEE Trans. Industrial Electronics, vol. 46, No. 1, pp. 23–30 Feb. 1999.

* cited by examiner

Primary Examiner—Peter S. Wong
Assistant Examiner—Gary L. Laxton
(74) Attorney, Agent, or Firm—Venable; Laurence J. Marhoefer (57) ABSTRACT

A high-performance contactless electrical energy transmission (CEET) technique which employs the inductive energy transmission principle is described. The proposed technique enables the implementation of high-efficiency, high-power-density, fully-regulated CEET systems suitable for applications with a wide input range and a wide load range. The CEET system in this invention consists of an input-side variable-frequency inverter and an output-side regulated rectifier. A high efficiency of the system is achieved by recovering the energy stored in the leakage inductances of the transformer by incorporating them in the operation of the circuit, and by employing high-frequency-inverter and controlled-rectifier topologies that allow a controlled bi-directional power flow through the transformer. A feed forward, variable-switching-frequency control of the inverter is used to maintain a substantially constant power transfer through the transformer when the input voltage changes. A local PWM control is used for the output-side rectifier to achieve a tight regulation of the output in the presence of load variations.

13 Claims, 11 Drawing Sheets

CONTACTLESS ELECTRICAL ENERGY TRANSMISSION SYSTEM

BACKGROUND OF THE INVENTION

This invention relates to an improved contactless electrical energy transmission system in which a transformer provides the only coupling between the power transmitter and the power receiver, and more particularly to an energy efficient system which tightly regulates the output against the input voltage and output current changes.

In many applications, the contactless electrical energy transmission (CEET) has distinct advantages over the conventional energy transmission system which uses wires and connectors. For example, the CEET has been the preferred power-delivery approach in hazardous applications such as mining and underwater environments due to the elimination of the sparking and the risk of electrical shocks [1]. Also, a number of CEET systems have been developed for electric vehicle battery-recharging applications because of their potential enhanced safety, reliability, and convenience. In addition, the CEET has been considered in medical applications since it makes possible to transfer electric energy, which is required for running implanted electrical circulatory assist devices, through the intact skin of a patient [2]. Finally, the CEET has been used in cordless electric toothbrushes and portable telephones to increase their reliability by eliminating the contacts between their battery charger and the battery.

Generally, the CEET is implemented by using magnetic induction, i.e., by employing specially constructed transformers. In such transformers, the energy from the primary to the secondary is transferred inductively through the air. Because of safety requirements and/or mechanical constraints, the transformers for CEET applications usually have a relatively large separation between the primary and secondary winding. Therefore, the characteristics of these transformers are very different from those of the conventional transformers which have good coupling between the windings.

Due to a large winding separation, the transformers for CEET applications have a relatively large leakage inductance, as well as increased proximity-effect winding losses. Furthermore, for the CEET transformers where the primary and secondary winding are wound on two magnetic pieces separated by an air gap, the magnetizing inductance is significantly reduced. This reduced magnetizing inductance increases the conduction losses because of the increased magnetizing current. In addition, due to a strong radiation from the gap, the transformers with a large air gap require a special attention to meet EMC requirements. To alleviate problems associated with the energy stored in a relatively large leakage inductance of a CEET transformer such as a reduced efficiency and increased component stress, converter topologies which incorporate the leakage inductance into the circuit operation such as resonant and soft-switched topologies are the optimal choice in CEET applications.

Figure 1:
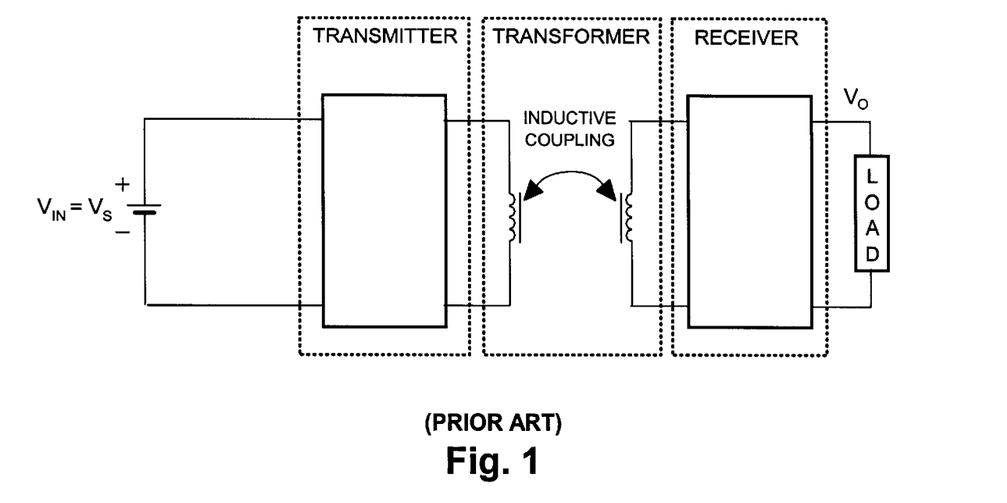
FIG. 1 Block diagram of a CEET system with dc (battery) input.
Figure 2:
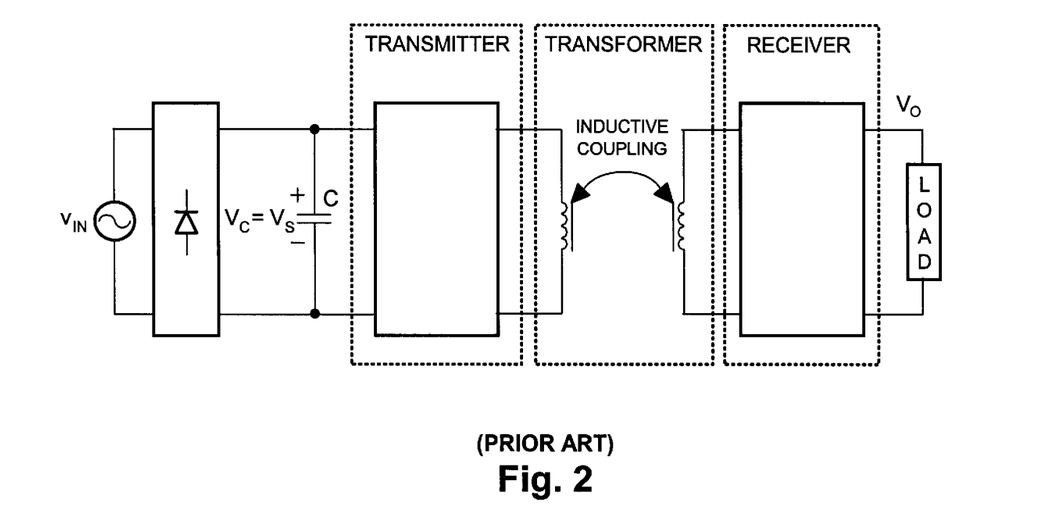
FIG. 2 Block diagram of a CEET system with ac input.

A typical CEET system consists of a transmitter, CEET transformer, and receiver, as shown in FIG. 1. The transmitter function is to generate an ac signal that is transferred to the receiver through the transformer. The transmitted signal is then conditioned by the receiver to provide the desire signal to the load. Generally, output voltage $V_o$ of the CEET can be either a dc or an ac voltage. Similarly, the input to the CEET system can be either a dc voltage, as shown in FIG. 1, or an ac voltage, as shown in FIG. 2. As can be seen from FIG. 2, for the ac input, the rectified input voltage is applied to the input of the transmitter.

With no connections between the input side and output side, the control and protection of CEET converters is very much different than the control of the converters that employ a conventional feedback control that uses signal communication between the output and input. Moreover, in CEET applications with wide input-voltage and load ranges that require a tight regulation of the output such, for example, in universal-line (90–264 Vac) chargers for portable telephones, control design requires a unique approach.

Various aspects of inductive CEET have been addressed in a number of papers and patents. For example, mechanical design issues related to CEET systems were discussed in [1], [3]–[7], where a number of mechanical structures for CEET systems were proposed. The common goal of all these inventions is to define a reliable, easy-to-use mechanical structure which can provide consistent characteristics of the CEET transformer so that the conversion efficiency and EMC performance can be optimized.

Some limited topological and control issues were presented in [1], [3], and [8]. In [1] and [3], inductive coupling was implemented at a high-frequency by employing an inverter on the input side to convert the source signal into a high-frequency signal that is coupled to the output rectifier circuit through a CEET transformer. In addition, [1] proposes a method of maximizing the transmitted power by the input-side control employing a phase-locked loop. In [8], a line-frequency inductive-coupling scheme and output voltage control using a saturable output-side inductor are described. Generally, a line-frequency CEET suffers from a significantly larger size and weight compared to its high-frequency counterpart.

However, so far, no high-power density, high-efficiency CEET system with tightly regulated output that is suitable for applications with wide input and load range has been proposed. Namely, the known CEET approaches are implemented so that power flow from the primary (input) to the secondary side (output) of the transformer is controlled. In addition, the regulation of the power flow is performed only on one side, i.e., either on the transmitter (input), or on the receiver (output) side. Therefore, it is hard to simultaneously optimize the conversion efficiency and achieve a precise output regulation under widely varying input voltage and load conditions. For example, if the load demand is decreased, a CEET system with a controllable transmitter can reduce the transferred power through the transformer either by reducing the input power, and/or by returning the excessive power stored in the primary-side resonant circuit to the input. However, it cannot precisely regulate the output because of the absence of direct communication link between the output and the controller, i.e., because it cannot control the energy transferred to the secondary side. On the other hand, a CEET system with a controllable receiver can precisely regulate the output with a local feedback loop. However, it cannot reduce the input power because of the absence of control in the transmitter. As a result, this type of CEET system must store the excessive energy in energy-storage components, which usually increases the stress on the components. In both cases, the conversion efficiency is adversely affected.

A CEET approach which can simultaneously achieve high efficiency and precise voltage regulation must be implemented with a topology which allows a controlled bi-directional power flow through the transformer, and should have a local regulation in both the transmitter and the receiver. With this approach, the operation of the CEET system with a wide input range and a wide load range can be achieved with a minimum circulating energy and stress on the components. Consequently, this approach exhibits a good efficiency and output regulation.

SUMMARY OF THE INVENTION

In this invention, a high-frequency, high-efficiency, fully-regulated CEET system suitable for applications with a wide input range and wide load range is described. The CEET system consists of an input-side high-frequency resonant inverter and an output-side locally-regulated rectifier that are used to transmit and regulate power through a transformer. The high efficiency of the system is achieved by recovering the energy stored in the leakage inductances of the transformer by incorporating them in the operation of the circuit, and by a employing high-frequency-inverter and a controlled-rectifier topologies that allow for bi-directional power flow through the transformer. With the ability of the system to transfer power through the transformer in both directions, i.e., from the input to the output, and vice verse, the energy stored in the leakage inductances can be either transferred to the output, or the input, depending on the load requirement.

The output regulation with respect to the input and load changes is performed by a dual modulation. A local variable-frequency modulation is used on the input side to maintain a substantially constant power transfer for a varying input, whereas a local PWM modulation on the output side is primarily used to tightly regulate the output against the load changes. The variable-frequency modulation is implemented with feedforward control, i.e., by changing the inverter's frequency as a function of the input voltage.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE PREFERRED EMBODIMENTS

Figure 3:
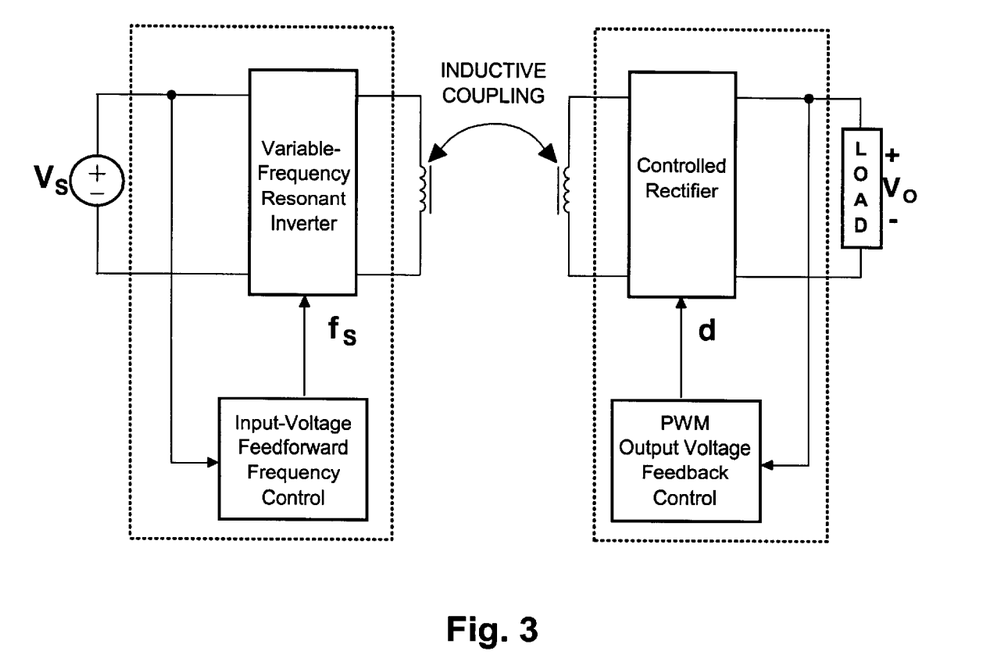
FIG. 3 Block diagram of the CEET system of the present invention.

A block diagram of the CEET system of the present invention is shown in FIG. 3. The system consists of a variable-frequency (VF) resonant inverter at the input side and a controlled bi-directional rectifier at the output side that are inductively coupled trough a transformer. The input voltage to the inverter is sensed and the sensed voltage is used to control the switching frequency of the inverter so that the transferred power through the transformer is maintained substantially constant with the input voltage changes. Generally, the frequency modulation scheme can be nonlinear. The bi-directional rectifier at the output side is controlled by a PWM control to maintain a tight regulation of the output voltage in the presence of a varying load, as well as to provide, if necessary, additional regulation against the input voltage changes not rejected by the variable-frequency control of the input-side inverter.

To maximize the conversion efficiency by recovering the energy stored in relatively large inductances of the CEET transformer, the variable-frequency inverter needs to be implemented with a resonant topology. Generally, any resonant topology can be employed. In addition, the resonant inverter can be operated below or above the resonant frequency depending on the application. If operated above the resonant frequency, the inverter switches are turned on at zero voltage, which is preferred in applications with a high input voltage. If the inverter is operated below the resonant frequency, the inverter switches are turned off at zero current, which is advantageous in high-current applications, and/or when IGBTs (Insulated-Gate Bipolar Transistors) are used for the switches.

Figure 4:
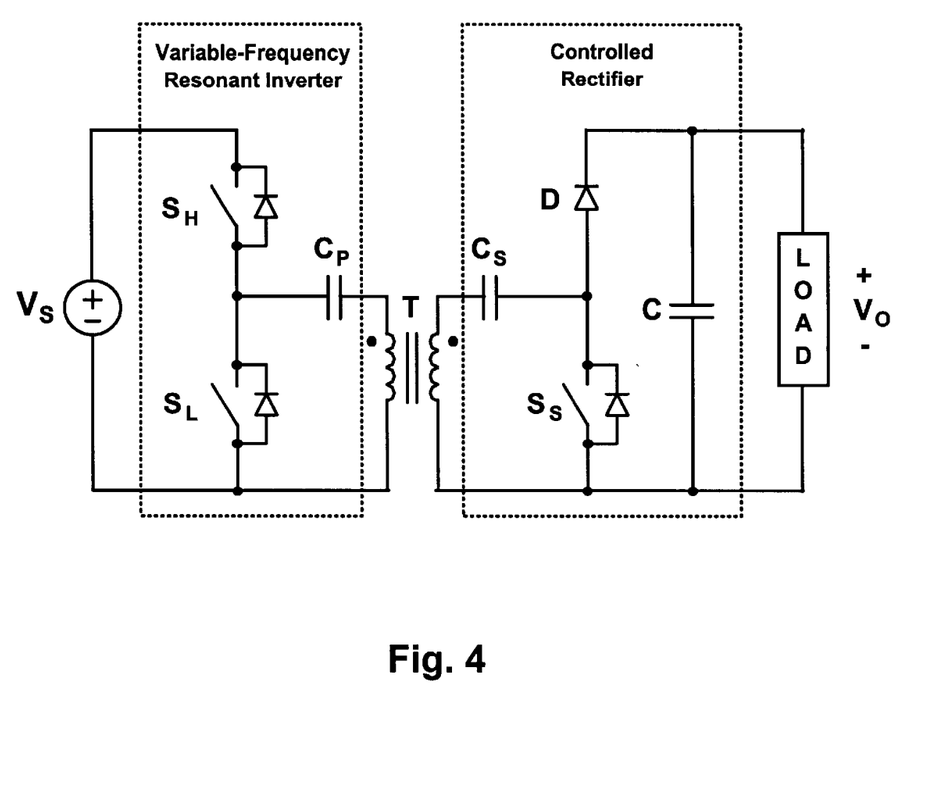
FIG. 4 Schematic diagram of inductive-coupled power stage with a series-resonant inverter and controlled rectifier as example of an embodiment of the present invention.
Figure 5:
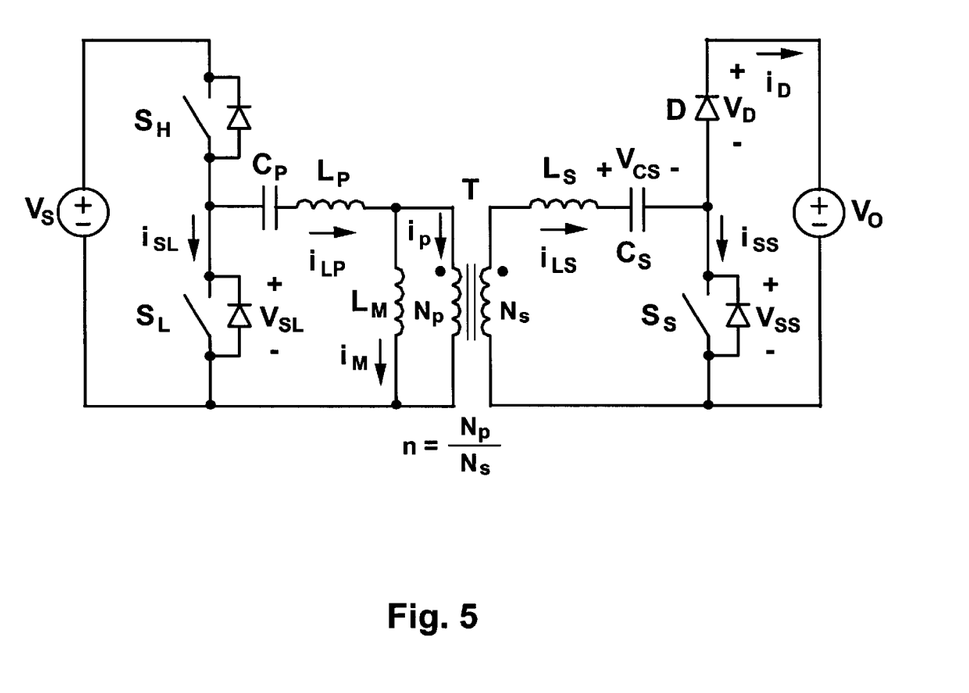
FIG. 5 Detailed schematic block diagram of the power stage in FIG. 4 that shows the leakage and magnetizing inductances of the transformer, and the reference directions of the currents and voltages.

As an example, FIG. 4 shows the implementation of the CEET system of this invention with a series resonant inverter. The input power circuit is comprised of a pair of switches $S_H$ and $S_L$ and a resonant capacitor $C_p$. The output load circuit is comprised of secondary switch $S_S$, a resonant capacitor $C_s$, a diode D and a filter capacitor C. The switches are shown with their antiparallel diodes. To facilitate the analysis of the circuit, FIG. 5 shows the circuit in FIG. 4 with the leakage $L_p$, $L_s$ and magnetizing $L_M$ inductances of the transformer explicitly shown. Also, in FIG. 5 the load is replaced by a voltage source because it is assumed that the output voltage is constant and has a negligible ripple. The series resonant circuit in FIG. 5 is formed by capacitors $C_p$ and $C_S$, and leakage inductances $L_p$ and $L_s$. The approximate resonant frequency of the resonant circuit is given by $$\omega_0 = \frac{1}{\sqrt{(L_p + n^2 L_s) \cdot (C_p + C_s/n^2)}},$$

where $n = N_p/N_s$ is the turns ratio of the transformer.

Figure 6:
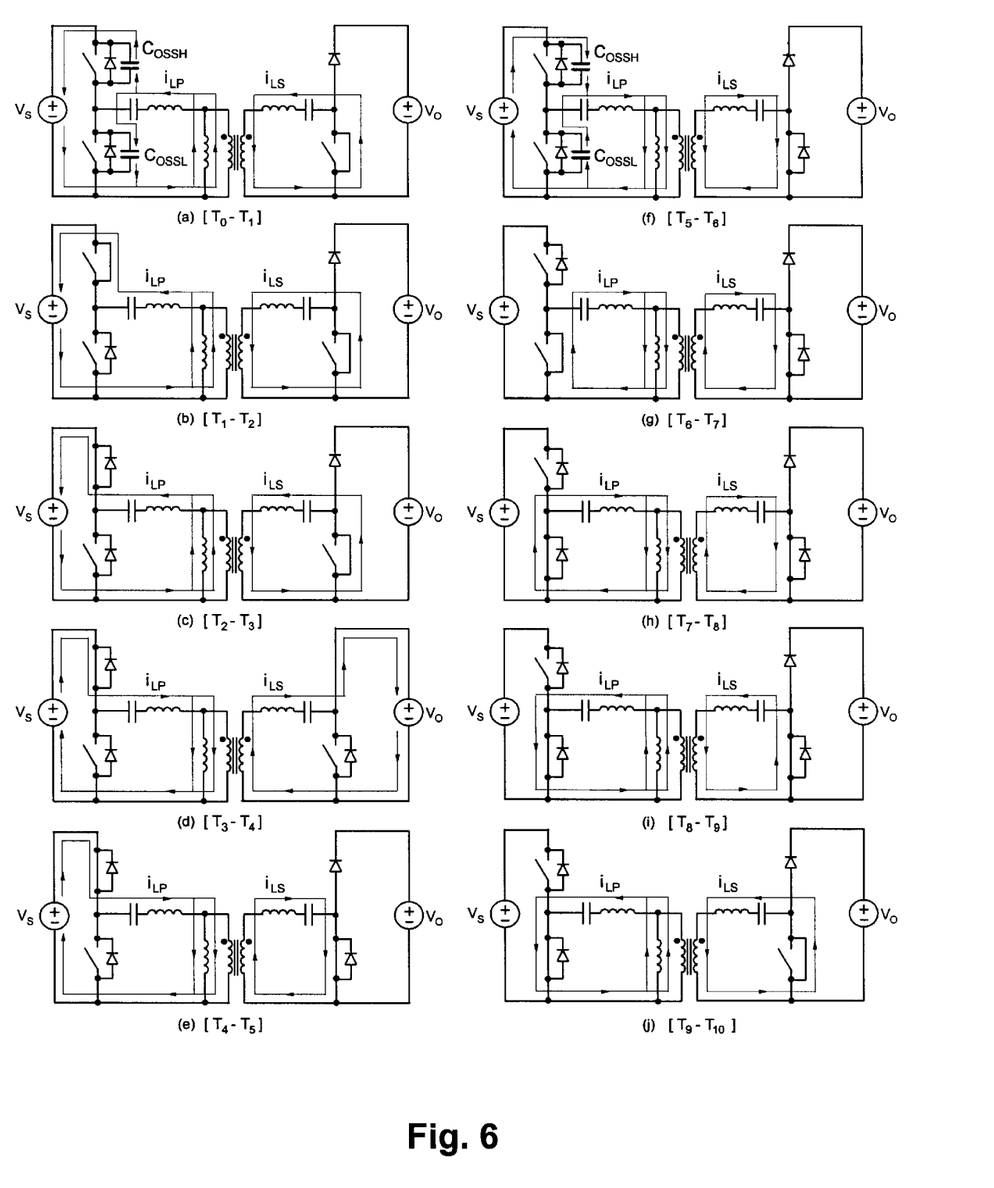
FIG. 6 Topological stages of the power stage in FIG. 5 during a switching cycle.
Figure 7:
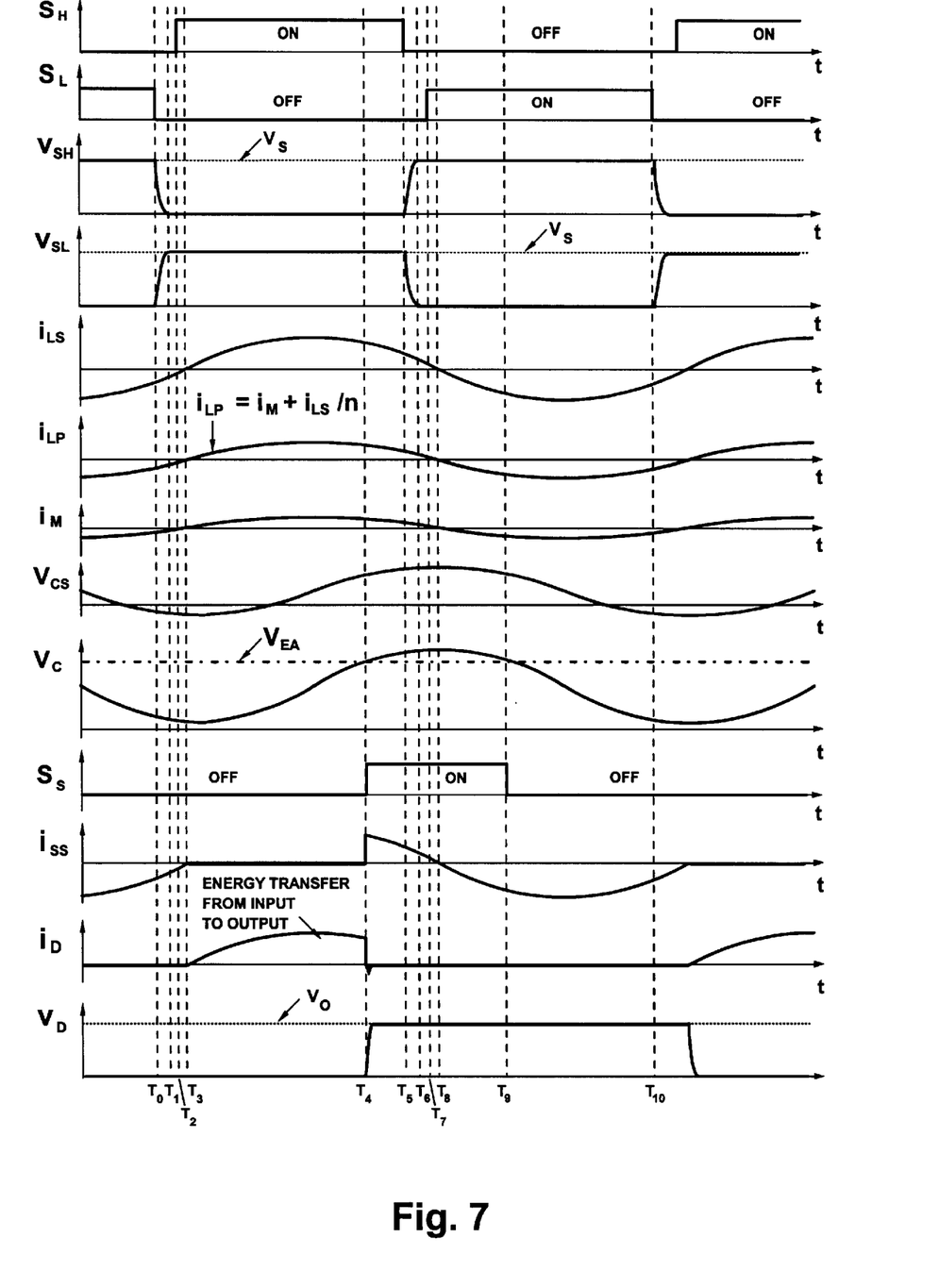
FIG. 7 Key waveforms of the power stage in FIG. 5.

To further facilitate the explanation of the operation, FIG. 6 shows topological stages of the circuit in FIG. 5 during a switching cycle, whereas FIG. 7 shows the power-stage key waveforms for operation above the resonant frequency.

The following analysis of operation of the circuit in FIG. 5 assumes that all semiconductor components in the circuit are ideal, i.e., that they exhibit zero resistance when in the on state and infinite resistance in the off state. However, the capacitances of the switches are not neglected in this analysis. Finally, to further simplify the analysis, it is assumed that the magnetizing current $I_M$ in FIG. 5 is in phase with resonant current $i_{LS}$. Generally, magnetizing current $i_M$ is lagging resonant current $i_{LS}$, and the amount of the phase lag is a function of the load. Nevertheless, this assumption does not have any significant effect on the explanation of the principle of operation of the proposed circuit.

Before low-side switch $S_L$ is turned off at $t=T_O$, negative primary-side resonant current $i_{LP}=i_M+i_P=i_M+i_{LS}/n$ flows through leakage inductance $L_p$, resonant capacitor $C_p$, and low-side switch $S_L$, whereas, negative secondary-side resonant current $i_{LS}$ flows through leakage inductance $L_S$, resonant capacitor $C_s$, and the antiparallel diode of secondary switch $S_s$, as shown in FIG. 6(j). At the same time, diode D is off blocking output voltage $V_O$, whereas, high-side switch $S_H$ is off blocking input voltage $V_s$.

After switch $S_L$ is turned off at $t=T_O$, resonant current $i_{LP}$ flowing through switch $S_L$ is diverted from the switch to its output capacitance $C_{OSSL}$, as shown in FIG. 6(a). As a result, the voltage across $S_L$ starts increasing, whereas the voltage across high-side switch $S_H$ starts decreasing, as illustrated in FIG. 7, since the sum of the voltages across $S_L$ and $S_H$ is equal to source voltage $V_S$. When the voltage across $S_L$ reaches zero at $t=T_1$, i.e., when output capacitance of high-side switch $C_{OSSH}$ is fully discharged, the antiparallel diode of switch $S_H$ begins to conduct, as shown in FIG. 6(b). At the same time, low-side switch $S_L$ is off blocking input voltage $V_S$. Because after $t=T_1$ source voltage $V_S$ is connected to the resonant circuit, the resonant current starts increasing. This topological stage ends at $t=T_3$ when $i_{LP}$ reaches zero and the antiparallel diode of $S_H$ stops conducting. As can be seen from FIG. 7, to achieve zero-voltage switching (ZVS) of $S_H$, it is necessary to turn on $S_H$ before $t=T_3$, i.e., $S_H$ should be turned on while its antiparallel diode is conducting. In FIG. 7, $S_H$ is turned on at $t=T_2$ with ZVS. As a result, after $t=T_3$, current $i_{LP}$ continues to flow through closed switch $S_H$, as shown in FIG. 6(c). Because of the assumption that currents $i_M$ and $i_{LS}$ are in phase, when direction of $i_{LP}$ is reversed at $t=T_3$, the direction of $i_M$ and $i_{LS}$ is also reversed, as illustrated in FIG. 7. Consequently, at $t=T_3$ current $i_{LS}$ which was flowing through the antiparallel diode of $S_s$ is diverted to rectifier diode D, as shown in FIG. 6(d). This topological stage ends at $t=T_4$, when secondary switch $S_S$ is turned on. As shown in FIG. 6(e), after $S_S$ is turned on, resonant current $i_{LS}$ is commutated from rectifier D switch $S_S$. This topological stage ends at $t=T_5$, when switches $S_H$ is turned off. After switch $S_H$ is turned off at $t=T_5$, resonant current $i_{LP}$ flowing through switch $S_H$ is diverted from the switch to its output capacitance $C_{OSSH}$, as shown in FIG. 6(f). As a result, after $t=T_5$, $C_{OSSH}$ is being charged, while $C_{OSSL}$ is being discharge. When $C_{OSSL}$ is fully discharged at $t=T_6$, the antiparallel diode of the switch $S_L$ begins to conduct, as shown in FIG. 6(g). At the same time, high-side switch $S_H$ is off blocking source voltage $V_s$. This topological stage ends at $t=T_8$, when $i_{LP}$ reaches zero, as shown in FIG. 6(h). As can be seen from FIG. 7, to achieve ZVS of $S_L$, it is necessary to turn on $S_L$ before $t=T_8$, i.e., $S_L$ should be turned on while the antiparallel diode of $S_L$ is conducting. In FIG. 7, $S_L$ is turned on at $t=T_7$ with ZVS. As shown in FIGS. 6(i) and 7, after $t=T_8$, the direction of currents $i_{LP}$, $i_M$, and $i_{LS}$ is reversed so that current $i_{LP}$ flows through $S_L$, whereas, current $i_{LS}$ flows through $S_S$. This topological stage ends at $t=T_9$, when secondary switch $S_S$ is turned off and current $i_{LS}$ flowing through $S_S$ is commutated to the antiparallel diode of $S_S$, as shown in FIG. 6(j). The circuit stays in this topological stage until the next switching cycle is initiated at $t=T_{10}$.

As can be seen from FIG. 7, the voltage stress of switches $S_H$ and $S_L$ is limited to source voltage $V_S$, while the voltage stress of switch $S_S$ and output rectifier D is limited to output voltage $V_O$.

As can be seen from the $i_D$ waveform in FIG. 7, in the circuit in FIG. 5, the energy is transferred from the input to the output only during the conduction of secondary-side rectifier D, i.e., during the time interval from $t=T_3$ to $t=T_4$. Generally, this time interval represents the time from the moment current $i_{LS}$ becomes positive at $t=T_3$ to the time secondary-side switch $S_S$ is turned off at $t=T_4$. Therefore, the output of the proposed converter can be regulated by varying the duration of the $T_3$–$T_4$ interval by controlling the turn-on instant of $S_S$.

In this invention, the secondary-side (rectifier) control is used primarily to regulate the output against the load changes. The regulation against the input voltage changes is implemented with a primary-side (inverter) control. However, since the primary-side control cannot tightly regulate the output on the secondary side, the secondary-side control is also used to assist in regulation against the input voltage changes.

Figure 8:
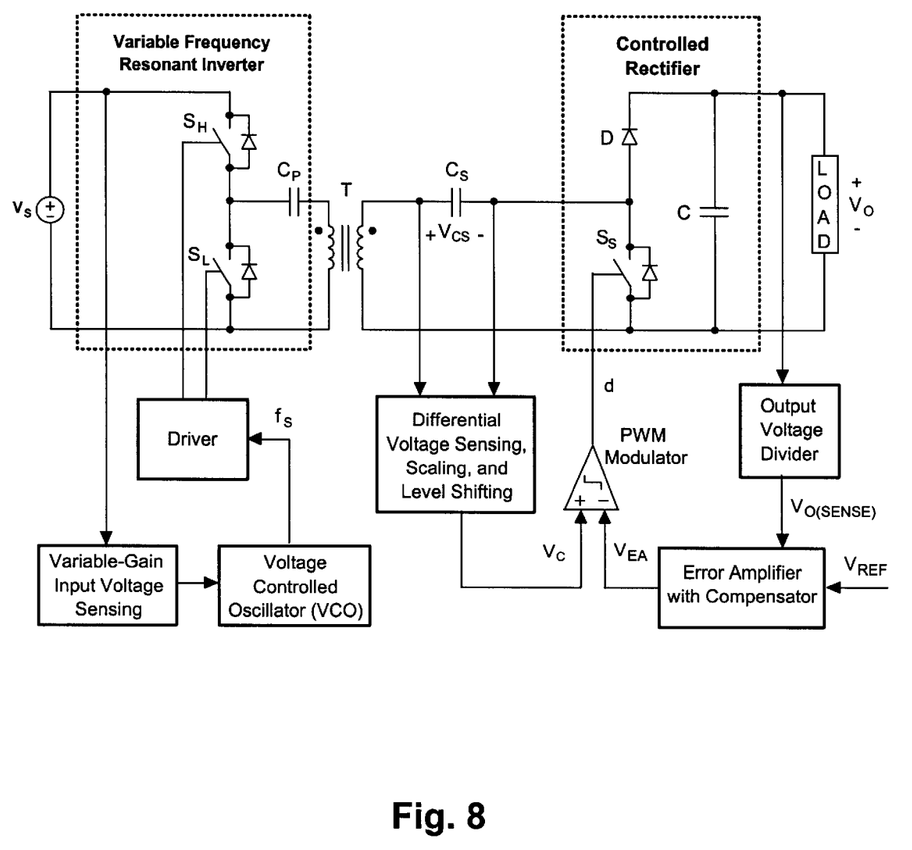
FIG. 8 Block diagram of a control for the power stage in FIG. 5.

An implementation of the CEET system according to this invention is shown in FIG. 8. The inverter control in FIG. 8 is implemented by sensing input voltage $V_S$ with a variable-gain input-voltage sensing circuit, and by changing frequency $f_S$ of the voltage-controlled-oscillator (VCO) so that the inverter maintains a substantially constant output power in the presence of input changes. Generally, for the operation above resonance, which offers ZVS, the frequency needs to be increased as the input increases. On the contrary, the operation below resonance that offers zero-current switching (ZCS) requires that the frequency be reduced as the input increases. In either case, the required change of the frequency is a nonlinear function of the input.

The output voltage control in FIG. 8 is implemented with a PWM modulation of the rectifier. In this control, sensed output voltage $V_{O(SENSE)}$ is compared with reference voltage $V_{REF}$ at the input of the error amplifier. The generated error signal at the output of error amplifier $V_{EA}$ is then compared with signal $V_C$ that is proportional to instantaneous secondary current $i_{LS}$. In the implementation in FIG. 8, the secondary-side current information is obtained indirectly, i.e., without the use of a sensing transformer or resistor. The indirect current sensing is implemented by a differential sensing of voltage $V_{CS}$ across capacitor $C_S$, and by a subsequent scaling and level shifting of the sensed voltage so that the minimums of the scaled voltage correspond to the zero crossings of secondary current $i_{LS}$, as can be seen from FIG. 7.

It should be noted that since secondary switch $S_S$ is turns on with a minimum duty cycle at full load, the time interval between $t=T_3$ and $t=T_4$ at full load is approximately a half of a switching cycle, i.e., the entire positive resonant current flows to the load. On the other hand, at no load, secondary switch $S_S$ turns on with maximum duty cycle so that the interval between $t=T_3$ and $t=T_4$ is zero, whereas, the time interval between $t=T_4$ and $t=T_5$ becomes a half of a switching cycle. Since without a load (or, at light loads) the resonant circuit is essentially undamped, primary resonant current $i_{LP}$ is significantly increased at no load. Generally, this increase of $i_{LP}$ at no load requires a protection circuit to ensure that the converter safely operates at no load. One approach to overcome the no-load problem is to detect the no-load condition, and to change the frequency of the inverter so that the power transfer through the inverter is reduced. This can be accomplished by rising the switching frequency if the inverter operates above resonance, or by reducing the switching frequency if the inverter operates below the resonant frequency. Another approach is to implement overcurrent protection with automatic restart, i.e., to turn off inverter switches $S_H$ and $S_L$ for a pre-set period of time and then restarts the inverter. By operating the circuit in this "burst", or "hiccup" mode, the light load efficiency can be maximized.

Figure 9:
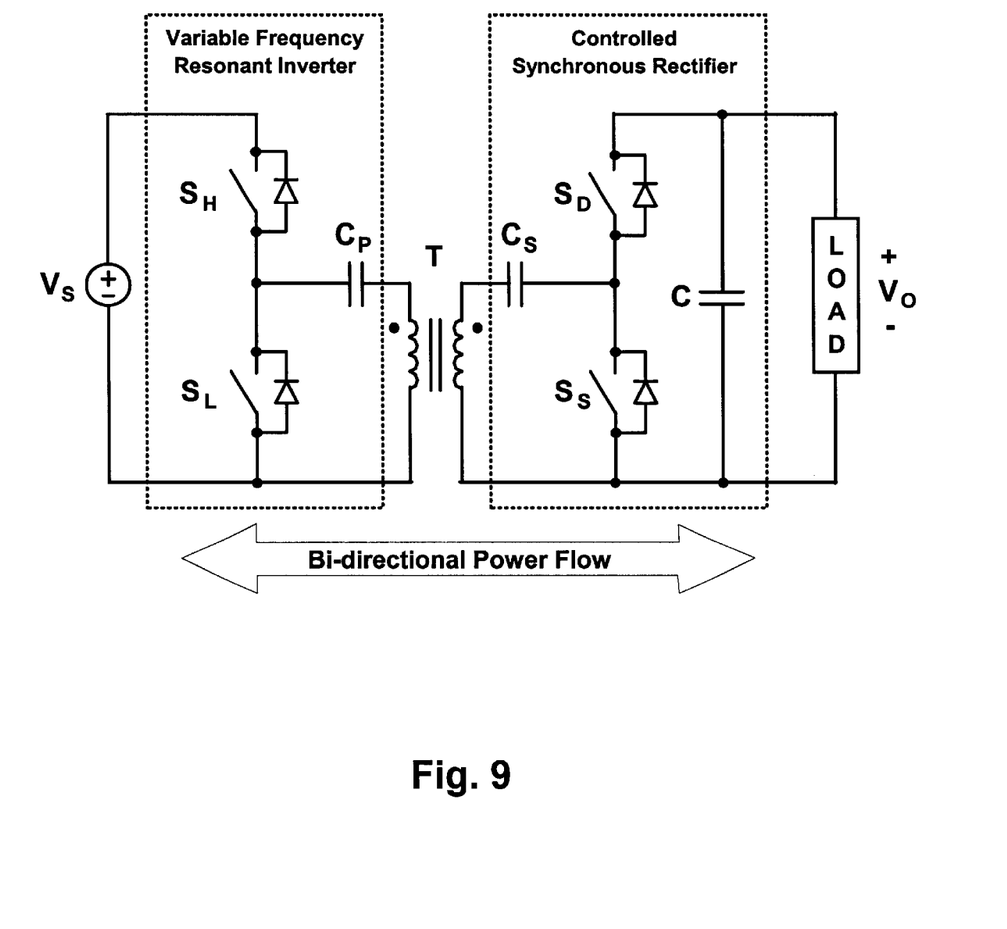
FIG. 9 Schematic circuit diagram of the power stage with a half-wave bi-directional rectifier.
Figure 10:
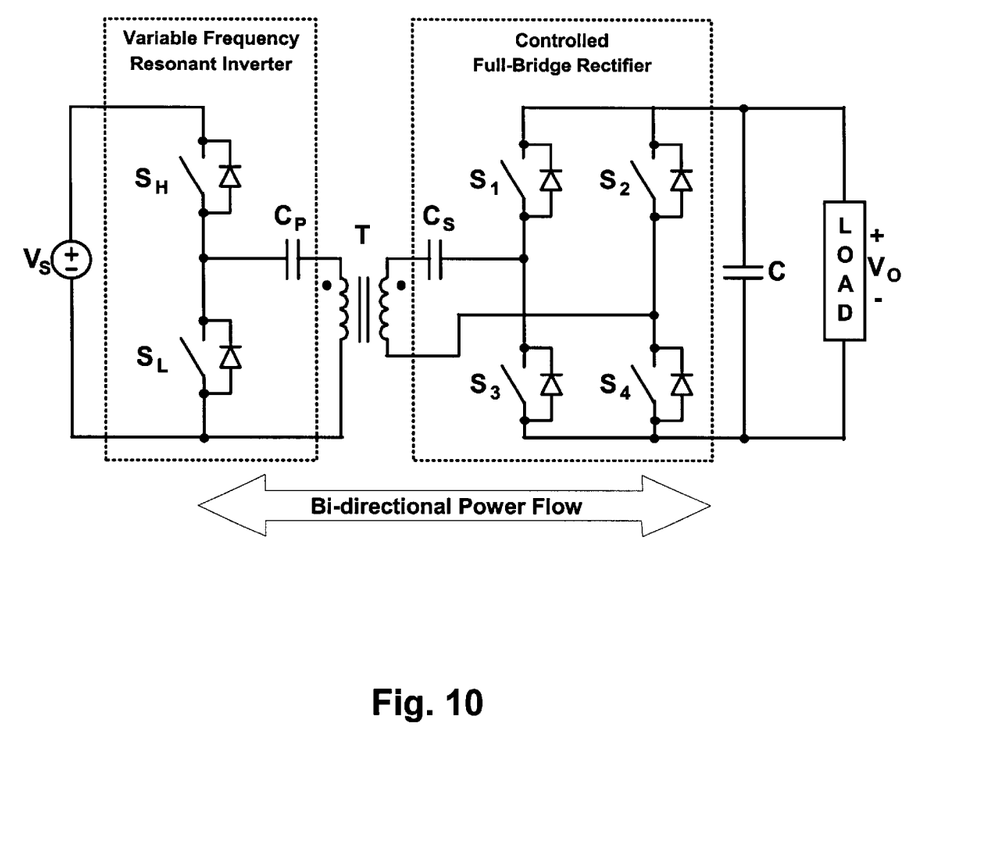
FIG. 10 Schematic circuit diagram of the power stage with a full-wave bi-directional rectifier.

Finally, in low output-voltage applications, the conversion efficiency of the CEET system in FIG. 5, can be improved by replacing rectifier D with a synchronous rectifier (SR), as shown in FIG. 9. Furthermore, the implementation in FIG. 9 allows bi-directional flow from the source to the load, and vice-verse, because both the inverter and the rectifier can conduct current in both directions. The CEET system with bi-directional power flow can be also implemented with full-wave bi-directional rectifier, as shown in FIG. 10.

The performance of the proposed inductive coupling charger was evaluated on a 4.5 W (5 V/0.9 A), universal-line-range (90–265 $V_{ac}$) battery charger for portable telephones. The experimental circuit was implemented with the following components: switches $S_H$ and $S_L$- IRF840; secondary switch $S_S$-IRF7421D1; and output diode D=30BQ015.

The transformer was built using ferrite cores (2624Z) with the primary winding (210 turns of AWG#31 magnet wire) and the secondary winding (9 turns of AWG#26 magnet wire). The control circuit was implemented with controllers MC14013, MC34082, and LM393. Two TL431 voltage-reference ICs are used for an output voltage reference and a bias voltage for the locally controlled rectifier. An IR2110 driver is used to generate the required gate-drive signals for switches $S_H$ and $S_L$.

The output voltage of the experimental charger was regulated with a voltage ripple less than 2% over the entire input-voltage range. The measured efficiency with the 60-mil separation (air gap) between the primary side magnetic piece and the secondary side magnetic piece of the transformer was approximately 60% at full load. The frequency range of the experimental circuit was from 65 kHz to 140 kHz.

Figure 11:
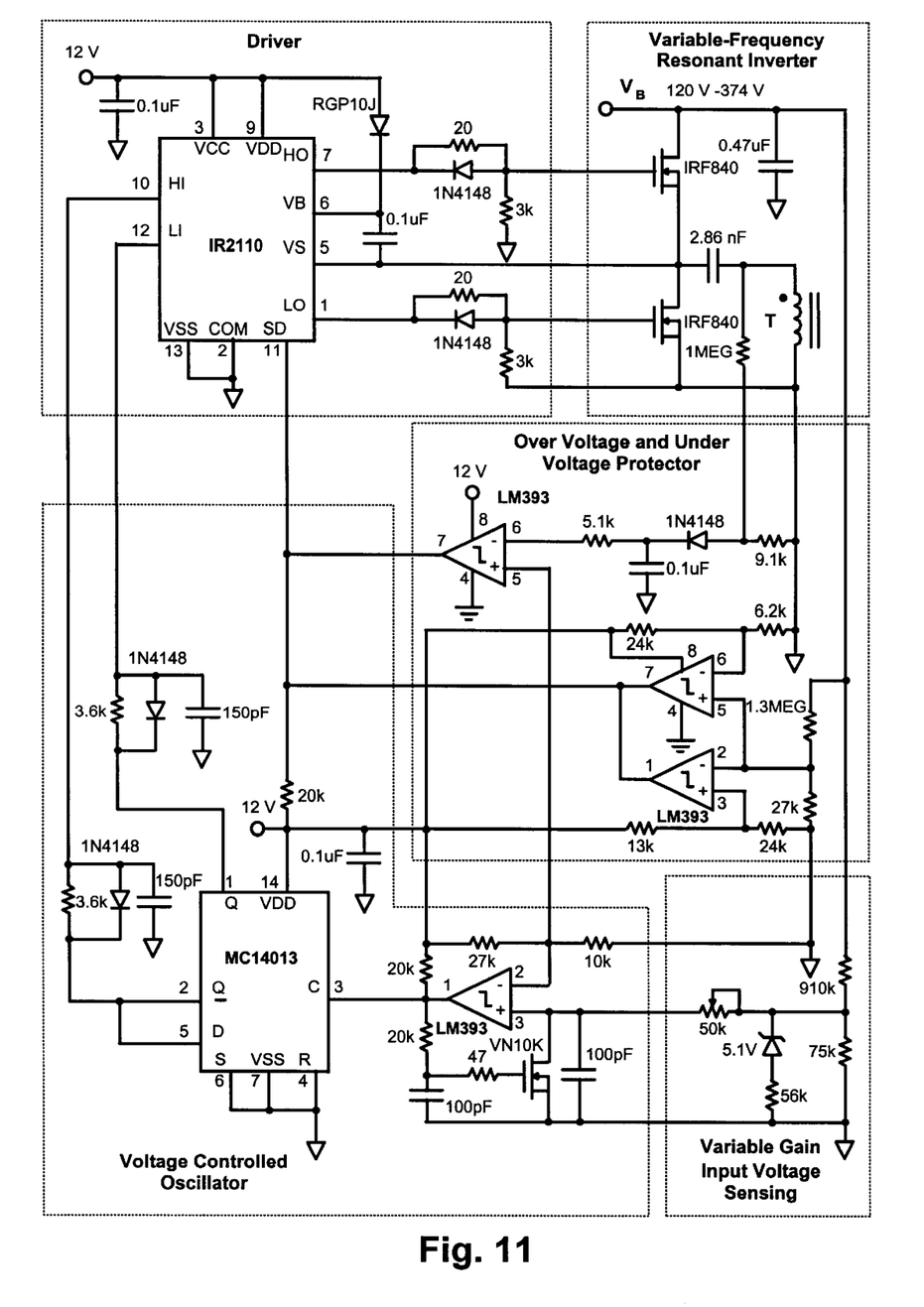
FIG. 11 Schematic diagram of the primary-side (inverter-side) of the experimental circuit.
Figure 12:
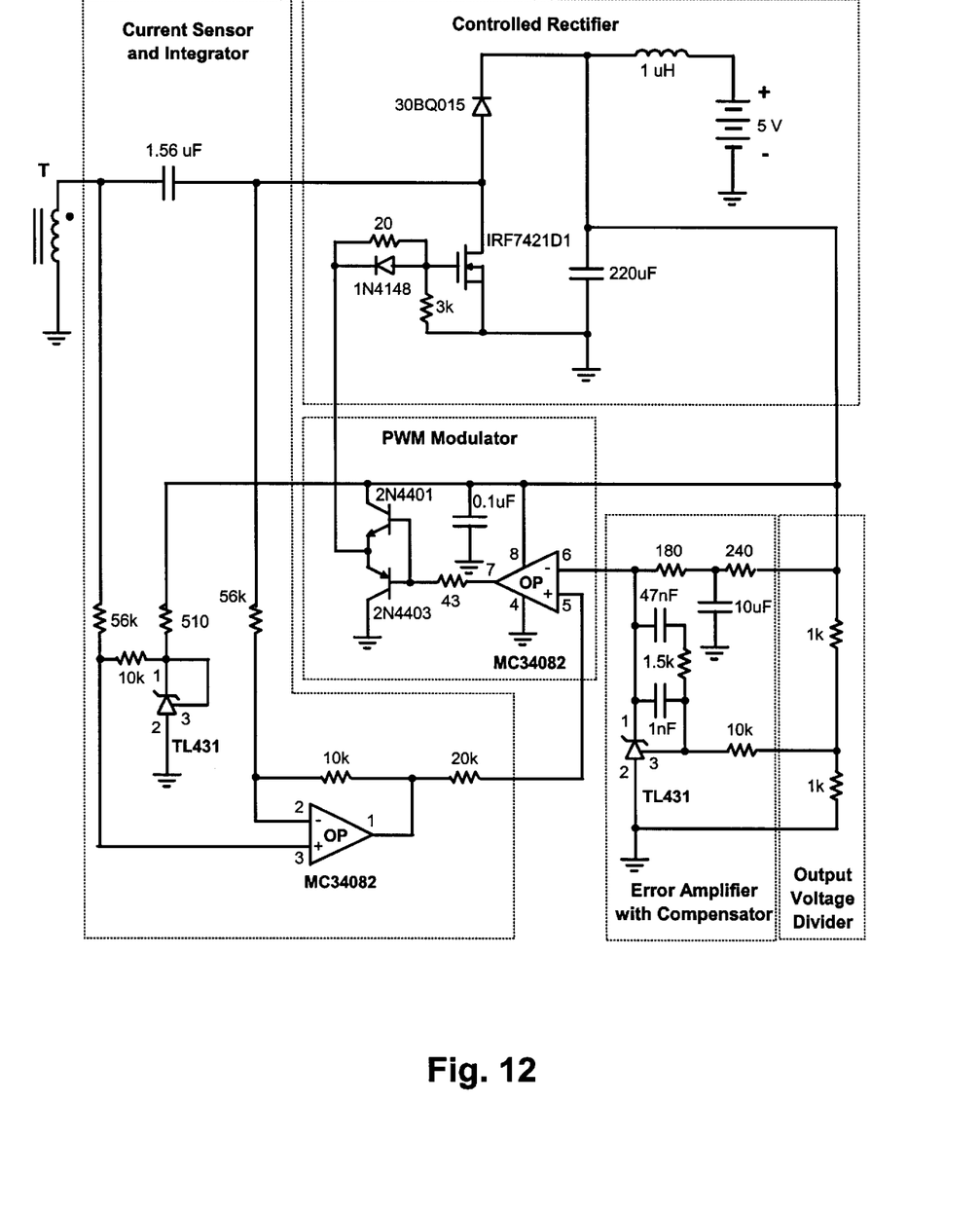
FIG. 12 Schematic diagram of the secondary-side (rectifier-side) of the experimental circuit.

FIGS. 11 and 12 show the schematic diagram of the transmitter and receiver part of the experimental prototype, respectively. The implementations shown in FIGS. 11 and 12 are given only as examples. Numerous modifications and variations within the scope of the present invention are possible.

References

1. D. A. G. Pedder, A. D. Brown, and J. A. Skinner, "A Contactless Electrical Energy Transmission System,", *IEEE Trans. Industrial Electronics*, vol.46, no.1, pp.23–30, Feb.1999
2. A. Ghahary and B. H. Cho, "Design of Transcutaneous Energy Transmission System Using a Series Resonant Converter," *IEEE Power Electronics Specialist's Conf. Record*, 1990, pp.1–8.
3. E. Dahl, Induction Charging System, U.S. Pat. No. 3,938,018, Feb. 10, 1976.
4. N. Ishi et al, Electric Power Transmitting Device with Inductive Coupling, U.S. Pat. No. 5,070,293, Dec. 3, 1991.
5. P. Carosa, Separable Inductive Coupler, U.S. Pat. No. 5,216,402, Jun. 1, 1993.
6. K. Klontz et al, Contactless Battery Charging System, U.S. Pat. No. 5,341,083, Aug. 23, 1994.
7. I. Shirai et al, Induction Charging Apparatus, U.S. Pat. No. 5,550,452, Aug. 27, 1996.
8. J. Bolger and L. Ng, Inductive! Power Coupling with Constant Voltage Output, U.S. Pat. No. 4,800,328, Jan. 24, 1989.

What is claimed is:

1. A contactless electrical energy transmission system for coupling an electric power source to a load, comprising in combination:

a transformer having a primary winding and a secondary winding;

a variable-frequency inverter coupling said electric power source to said primary winding of said transformer, said variable-frequency inverter comprising a controllable switching device and a resonant circuit, a controlled rectifier coupling said secondary winding of said transformer to said load, said controlled rectifier including a controllable switching device, a first control circuit connected entirely on the primary side of said transformer, said first control circuit responsive to the voltage changes of said power source; said first control circuit arranged to vary the switching frequency of said inverter so that the current through said primary winding of said transformer is maintained substantially constant when the voltage of the power source changes;

a second control circuit connected entirely on the secondary side of said transformer, said second control circuit responsive to the changes of said load, said second control circuit arranged to maintain the regulation of load voltage by controlling the amount of energy transferred through said controlled rectifier.

2. A contactless electrical energy transmission system as in claim 1, wherein said first control circuit comprising a variable-gain circuit coupled to a voltage-controlled oscillator, said variable-gain circuit arranged so that successive equal incremental changes of the voltage across said electric power source produce successively larger incremental changes of said switching frequency at the output of said voltage-controlled oscillator as said voltage across said electric power source increases.

3. A contactless electrical energy transmission system as in claim 1, wherein said controlled rectifier transmits power to said load and to said electric power source.

4. A contactless electrical energy transmission system as in claim 1, wherein said controllable switching device of said variable-frequency inverter is periodically switched between a conducting and a non-conducting state at a frequency that is greater than the resonant frequency of said resonant circuit.

5. A contactless electrical energy transmission system as in claim 1, wherein said controllable switching device of said variable-frequency inverter is periodically switched between a conducting and a non-conducting state at a frequency that is lower than the resonant frequency of said resonant circuit.

6. A contactless electrical energy transmission system for coupling an electric power source to a load, comprising in combination:

a transformer having a primary winding and a secondary winding, said primary winding having a primary leakage inductance, and said secondary winding having a secondary leakage inductance;

a variable-frequency inverter coupling said electric power source to said primary winding of said transformer, said variable-frequency inverter comprising a controllable switching device and a resonant circuit, said resonant circuit including said primary and secondary winding leakage inductance a controlled rectifier coupling said secondary winding of said transformer to said load, said controlled rectifier including a controllable switching device, a first control circuit connected entirely on the primary side of said transformer, said first control circuit responsive to the voltage changes of said power source; said first control circuit arranged to vary the switching frequency of said inverter so that the current through said primary winding of said transformer is maintained substantially constant when the voltage of the power source changes;

a second control circuit connected entirely on the secondary side of said transformer, said second control circuit responsive to the changes of said load, said second control circuit arranged to maintain the regulation of load voltage by controlling the amount of energy transferred through said controlled rectifier.

7. A contactless electrical energy transmission system as in claim 6, wherein said first control circuit comprising a variable-gain circuit coupled to a voltage-controlled oscillator, said variable-gain circuit arranged so that the same incremental changes of the voltage across said electric power source produce progressively larger incremental changes of said switching frequency at the output of said voltage-controlled oscillator as said voltage across said electric power source increases.

8. A contactless electrical energy transmission system as in claim 6, wherein said controlled rectifier transmits power to said load and to said electric power source.

9. A contactless electrical energy transmission system as in claim 6, wherein said controllable switching device of said variable-frequency inverter is periodically switched between a conducting and a non-conducting state at a frequency that is greater than the resonant frequency of said resonant circuit.

10. A contactless electrical energy transmission system as in claim 6, wherein said controllable switching device of said variable-frequency inverter is periodically switched between a conducting and a non-conducting state at a frequency that is lower than the resonant frequency of said resonant circuit.

11. A contactless electrical energy system as in claim 6, wherein said secondary winding of said transformer is coupled to said controlled rectifier through a capacitor.

12. A contactless electrical energy system as in claim 11, wherein said capacitor is part of said resonant circuit.

13. A contactless electrical energy system as in claim 11, wherein said second control circuit comprising in combination:

a differential-voltage-sensing, scaling, and level-shifting circuit coupled across said capacitor providing a time-varying sensed voltage proportional to an integral of the current of said secondary winding of said transformer, said time-varying sensed voltage being level shifted so that said time-varying sensed voltage is of one polarity with voltage minimums coinciding with the zero-crossings of the current of said secondary winding;

an error amplifier arrange to receive a scaled output signal and a voltage reference signal, said error amplifier providing an output signal proportional to the error between said scaled output signal and said voltage reference signal;

a modulator for comparing said output signal of said error amplifier with said time-varying sensed voltage provided by said differential-voltage-sensing, scaling, and level-shifting circuit and for providing a control signal for said controllable switching device of said controlled rectifier so that during each switching period of said variable-frequency inverter said controllable switching device of said controlled rectifier are kept closed during a switching period only for a minimum time interval to maintain the regulation of said load and kept open for the rest of said switching period.

* * * * *